United States Patent
Beilfuss et al.

[11] Patent Number: 5,215,358
[45] Date of Patent: Jun. 1, 1993

[54] REAR WHEEL VALVE SWITCHOVER TIRE DELAY FOR ABS

[75] Inventors: Hans-Juergen Beilfuss, Hofheim; Michael Vogt, Frankfurt am Main, both of Fed. Rep. of Germany

[73] Assignee: Alfred Teves GmbH, Frankfurt am Main, Fed. Rep. of Germany

[21] Appl. No.: 754,357

[22] Filed: Aug. 29, 1991

Related U.S. Application Data

[63] Continuation of Ser. No. 512,725, Apr. 23, 1990, abandoned.

[30] Foreign Application Priority Data

Apr. 29, 1989 [DE] Fed. Rep. of Germany ....... 3914401

[51] Int. Cl.$^5$ .............. B60T 8/62; B60T 8/32
[52] U.S. Cl. ............... 303/114.3; 303/962; 303/113.1; 303/113.5
[58] Field of Search ............ 303/9.62, 9.71, 9.73, 303/9.74, 61, 91, 93, 97, 100, 104, 105, 107, 110, 113 R, 113 AP, 114 PN, 115 VM, DIG. 1, DIG. 2; 180/197

[56] References Cited

U.S. PATENT DOCUMENTS

| | | | |
|---|---|---|---|
| 3,026,853 | 3/1962 | Stelzer | 92/99 X |
| 3,578,820 | 5/1971 | Riordan | 303/114 PN |
| 3,646,758 | 3/1972 | Cripe | 60/54.6 P |
| 4,183,588 | 1/1980 | Snyder | 303/114 PN |
| 4,269,533 | 5/1981 | Mashiki et al. | 403/410 |
| 4,460,963 | 7/1984 | Leiber et al. | 303/105 X |
| 4,489,382 | 12/1984 | Jonner et al. | 303/110 X |
| 4,505,520 | 3/1985 | Maehara | 303/111 X |
| 4,567,728 | 2/1986 | Ohmi et al. | 60/547.1 |
| 4,585,280 | 4/1986 | Leiber | 303/105 X |
| 4,657,310 | 4/1987 | Klein | 303/9.62 |
| 4,702,531 | 10/1987 | Kircher et al. | 303/114 PN |
| 4,824,185 | 4/1989 | Leiber et al. | 303/100 X |
| 4,925,253 | 5/1990 | Swiden | 303/110 |
| 4,943,123 | 7/1990 | Takeda et al. | 303/9.62 X |
| 4,943,922 | 7/1990 | Tanaka | 303/110 X |

FOREIGN PATENT DOCUMENTS

| | | |
|---|---|---|
| 2589413 | 5/1987 | France . |
| 2196076 | 4/1988 | United Kingdom . |
| 2231110 | 11/1990 | United Kingdom ......... 303/114 PN |

Primary Examiner—Robert J. Oberleitner
Assistant Examiner—Josie A. Ballato
Attorney, Agent, or Firm—Robert P. Seitter; J. Gordon Lewis

[57] ABSTRACT

A circuit configuration for an anti-locking brake system controlled according to a multiplex process. The circuit configuration is designed such that upon commencement of an anti-locking control, if the first wheel to become instable is a front wheel (VL) the reswitching of the wheel valves (4) leading to the rear wheel brakes (22, 23), is delayed by a predetermined period of time of about 4 to 20 milliseconds. This therefore prevents the pressure from excessively rising upon commencement of the anti-locking control.

2 Claims, 1 Drawing Sheet

REAR WHEEL VALVE SWITCHOVER TIRE DELAY FOR ABS

This application is a continuation of application Ser. No. 07/512,725 filed Apr. 23, 1990 now abandoned.

BACKGROUND OF THE INVENTION

The present invention relates to a circuit configuration for controlling the pressure decrease in an anti-locking control system, comprising a master brake cylinder connected to the brake wheels through multi-way valves open in the initial position and reswitchable to blocking, and a brake pressure modulator coupled upstream of the master brake cylinder. The circuit configuration is controllable in accordance with a multiplex process, with the multi-way valves leading to the wheel brakes being reswitchable upon commencement of the anti-locking control to the blocking position and with the pressure in the master brake cylinder being reducible.

In known systems of this type, the pressure modulator is provided as an assembly operated by hydraulic auxiliary pressure or vacuum, which assembly serves both for brake force boosting and for generating an auxiliary force counter-acting the pedal force. In the event of slip control, the assembly reduces the pressure in the working chambers of the master brake cylinder (DE-OS 33 17 629; DE OS 36 41 105; and, German Patent Application P 38 22 260.4). Brake systems of this type are operated in the known multiplex process and therefore need only a relatively small number of brake pressure control valves. One multiway valve open in the initial position and reswitchable to blocking is provided in the pressure fluid conduit leading from the master brake cylinder to one or to two wheel brakes, respectively. Upon commencement of the anti-locking control, first, all valves leading to the wheel brakes are reswitched; subsequently, the brake pressure in the master cylinder is decreased and only the wheel valve which leads to the instable wheel is reopened. Consequently, the brake pressure in the wheel brake of that wheel will decrease while, in the rest state of the wheel brakes, it will remain constant. In the same manner, the brake pressure in the other wheel brakes will be successfully modulated, that is, decreased, kept constant or further increased.

During blocking of the inlet valves in this initial phase of the anti-locking control, which coacts with the development of the auxiliary force counter-acting the pedal force and, in some cases, with a blocking or decoupling of the pedal (Patent Application P 38 22 260.4), at least in unfavorable conditions, the pressure in the master brake cylinder further rises or excessively increases. This is disadvantageous because the pressure decrease in the wheel tending to lock, which is required in that phase, thereby is delayed thus affecting the control and the control quality, respectively.

It is, therefore, an object of the present invention to overcome this disadvantage while avoiding the need for substantial additional efforts and avoiding still other disadvantages. It has been found that this problem is solved by a circuit configuration of the type referred to in the foregoing, a particular feature of which is that, in the first control phase, if the first wheel tending to lock is a front wheel, the reswitch of the wheel valves leading to the rear wheel brakes is delayed by a predetermined period of time.

SUMMARY OF THE INVENTION

The invention advantageously utilizes the principle that in the majority of cases, in particular in critical cases, the first wheel to become instable is a front wheel. In such a situation, some minor temporary further increase in pressure in the rear wheel brakes has no notable influence on the running stability of the wheels or is even advantageous for the braking operation. However, precluding the pressure from excessively rising and the particularly rapid pressure decrease of the brake pressure in the instable front wheel attainable thereby, leads to a substantial improvement of the control because the risk that the wheel slip will become excessively high due to an excessively slow brake pressure decrease, thereby is overcome.

According to one advantageous embodiment of the circuit configuration of the present invention, the predetermined period of time by which the response of the rear wheel valves can be delayed, is between 4 and 20 milliseconds, and preferably between 5 and 10 milliseconds. The duration of that period of time is adjusted to the respective brake system, in particular, to the brake pressure generator and its dead times. The optimal value can be determined empirically.

BRIEF DESCRIPTION OF THE DRAWING

Additional features, advantages and applications will become manifest from the following detailed description of one embodiment with reference to the accompanying drawing, wherein.

DETAILED DESCRIPTION

Figure 1:
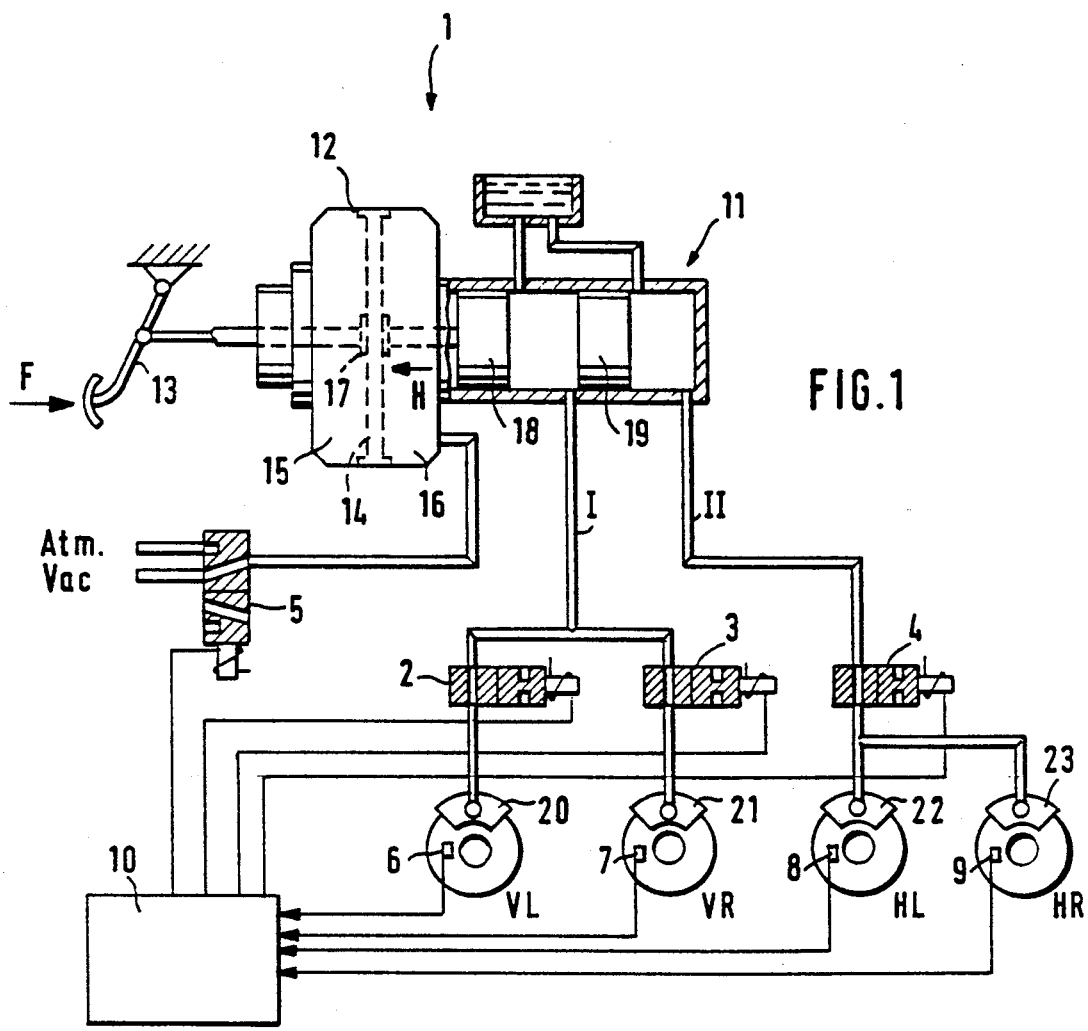
FIG. 1 illustrates the essential components of a brake system of the type utilized in practicing the present invention; and, FIG. 2 diagrammatically illustrates the brake pressure pattern in the initial phase of an anti-locking control.

Referring now to the drawing, FIG. 1 shows a brake system employed with the circuit configuration of the present invention, comprising a brake pressure generator 1, wheel valves 2 to 4, a modulator pressure control valve 5, wheel sensors 6 to 9, and an electronic controller 10 incorporating the circuit configuration of the present invention. The brake pressure generator 1, in turn, comprises a master brake cylinder 11 and a servo aggregate 12 coupled thereto and serving both as a brake force booster and for generating an auxiliary force H counteracting the pedal force F. The brake force, through a pedal 13, respectively, is applied to the brake force generator 1 and to the servo-aggregate 12.

The servo-aggregate 12, in the embodiment of the present invention described herein, largely corresponds to a conventional vacuum pressure brake force booster. The interior chamber of the aggregate 12, through a piston 14, is subdivided into two chambers 15, 16. In the resting position of the brake system as shown, vacuum prevails in both chambers which is caused through a connection "Vac" and through the modulator pressure control valve 5 in the working chamber. A valve 17 shown only schematically, which is open in the resting position of the brake provides vacuum in the pedal-sided chamber 15. "Vac" symbolizes the connection of the brake system serving as an auxiliary energy source for brake force boosting and brake pressure modulation. The brake force boosted in the aggregate 12, is transmitted in known manner to the working pistons 18 and 19 of a tandem master brake cylinder 11, and from the working chambers thereof, through brake circuits I, II and through valves 2 to 4 switched to the passage position, is passed to the wheel brakes 20 to 23.

The information on the rotating pattern of the individual wheels of the vehicle is obtained through wheel sensors 6 to 9 and is provided in the form of electrical signals to the controller 10 generating corresponding control signals for the wheel valves 2 to 4 and for the control valve 5.

The operation of the described brake system is as follows: As long as there is no locking tendency, all valves will maintain their switching position as shown in FIG. 1. The servo aggregate 12 serves as a brake force booster. Once a locking tendency is sensed on a wheel, for example, on the left hand front wheel VL, the anti-locking control will commence. First, all wheel valves 2 to 4 are closed with the closing of the valves associated with the rear wheels delayed as described below. Atmospheric pressure is admitted to the working 16 through switching of the modulator pressure control valve 5, thereby causing the auxiliary force H counteracting the pedal force F to develop. If the brake pressure generator 1 is provided with a means for locking or decoupling the pedal 13 from the piston 14, the pedal 13 at the same time, that is, upon commencement of the anti-locking control, is blocked and decoupled, respectively. Systems of this type are known in the art for which reason and for ease of understanding, are not illustrated and described in greater detail herein.

Once the pressure in the master brake cylinder 11 has decreased to or below the pressure level prevailing upon commencement of the brake pressure control, the wheel valve 2 leading to the wheel having become instable (in the present instance, to the left front wheel VL) is reswitched to passage so that the brake pressure in the wheel brake 20 can drop. The brake pressure, in the rest of the brakes 21 to 23, in view of the wheel valves 3 and 4, remains constant. Subsequently, the brake pressure in the remaining wheels, can be lowered or further increased, as is required.

Figure 2:
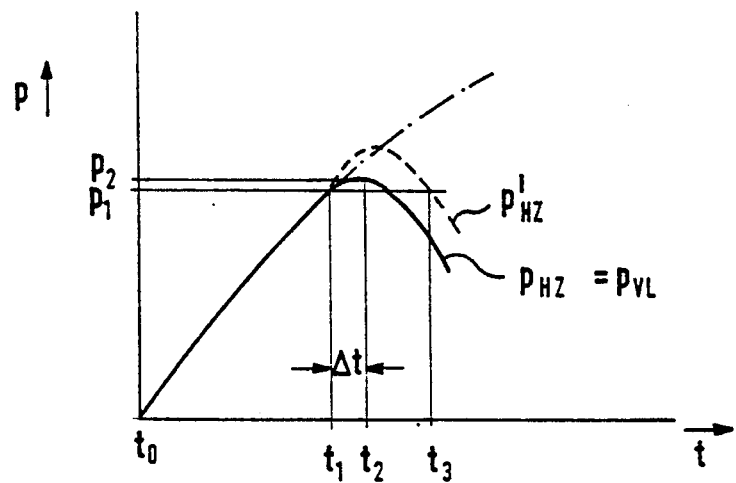

FIG. 2 shows the brake pressure pattern $P_{HZ}$ in the master brake cylinder 11 during the afore-described control phase. At the time $t_0$, the braking process will commence, At the time $t_1$, one wheel (the left hand front wheel VL) will become instable causing the anti-locking control to commence. At the time $t_1$, the modulator pressure control valve 5 is reswitched thereby causing a rise in the pressure in the chamber 16. The wheel valve 2, which leads to the left hand front wheel VL having become instable, continues to be switched to passage (or is switched back to passage immediately upon commencement of the control). The wheel valve 3 leading to the second front wheel VR is reswitched to blocking. The multi-way valve 4 leading to the rear wheels, however, in accordance with the present invention, is reswitched to blocking only at time $t_2$, that is, after a delay of, for example, 5 to 10 milliseconds. Accordingly, pressure p(sub) 1, prevailing at the time t(sub) 1, is "locked" in the wheel brake 21 of the right hand front wheel, while the slightly higher brake pressure $p_2$ (or a part thereof if a brake pressure reducer is provided) is "locked" in the rear wheel brakes 22, 23. As shown in FIG. 2, after commencement of the anti-locking control at the time $t_1$, a brake pressure decrease in the wheel brake 20 of the wheel VL having become instable is attained relatively rapidly.

It should be noted that without the delay $t=t_2-t_1$ pending reswitch of the wheel valve 4 in the connection of the rear wheels HL, HR, the pressure pattern $p'_{HZ}$ in the master brake cylinder 11 shown in broken lines in FIG. 2, and, hence, also in the wheel brake 20, otherwise would have resulted.

The line-dotted pressure curve shows a "non-interfered" brake pressure rise. This is because a simultaneous reswitching of all valves 2 to 4 (at the time $t_1$) corresponds to a sudden switch-off of all pressure fluid consumers connected to the brake pressure generator. The limited changes in the brake pressure generator arising, for example, as a consequence of the inert masses of its components, lead to an actual increase or excessive rise in the pressure. In lieu of the rapid pressure decrease desired at time $t_1$ as a measure against the locking tendency, the control cycle as a result of the decoupling of all wheel brakes, initially, would commence upon an undesired pressure rise. In that critical control phase, in which the attainable quality of the anti-locking control is dependent on the pressure decreasing speed, such an excessive rise in the pressure would be highly disadvantageous. A decrease of the brake pressure in the wheel brake 20 therefore could only commence at time $t_3$ at the earliest. Thus, in the practice of the present invention, a substantial improvement of the anti-locking control is attained by a relatively simple alteration or modification of the control circuit.

What is claimed is:

1. A circuit configuration for controlling the pressure decrease in an anti-lock brake system, said circuit configuration comprising:
    a source of variable fluid pressure;
    fluid pressure control means adapted for selective connection to:
    (a) a brake pedal,
    (b) a vacuum source, and
    (c) a source of atmospheric pressure for controlling the fluid pressure of said source of variable fluid pressure in response to the brake pedal, the vacuum source and the source of atmospheric pressure;
    first and second front wheel brakes associated with right and left front wheels, respectively, of a vehicle;
    first and second rear wheel brakes associated with right and left rear wheels, respectively, of the vehicle;
    first valve means for selectively connecting said source of variable fluid pressure to said first and said second front wheel brakes;
    second valve means for selectively connecting said source of variable fluid pressure to said first and said second rear wheel brakes;
    sensing means for sensing the rotational behavior of the wheels of the vehicle and the tendency of wheel lock in any of the wheels of the vehicle;
    and control means responsive to said sensing means for controlling:
    (a) said fluid pressure control means to apply atmospheric pressure to said fluid pressure control means to reduce the fluid pressure of said source of variable fluid pressure when the tendency of wheel lock in any of the wheels of the vehicle is sensed, and
    (b) said first valve means and said second valve means:
    (i) to first:

(1) connect said source of variable fluid pressure to that front wheel brake associated with the front wheel for which the tendency of wheel lock has been sensed, and (2) disconnect from said source of variable fluid pressure that front wheel brake not associated with the front wheel for which the tendency of wheel lock has been sensed when the wheel exhibiting the tendency of wheel lock is a front wheel, and (ii) after a predetermined period of time after said front wheel brake associated with the front wheel for which the tendency of wheel lock has been sensed has been connected to said source of variable fluid pressure to disconnect from said source of variable fluid pressure said first and said second rear wheel brakes.

2. A circuit configuration according to claim 1 wherein:

(a) said source of variable fluid pressure is a master brake cylinder, and (b) said fluid pressure control means include:

(i) a servo aggregate adapted for connection to the brake pedal and connected to said master brake cylinder, and (ii) a modulator pressure control valve connected to said servo aggregate and adapted for selective connection to the vacuum source and the source of atmospheric pressure in response to said control means to selectively connect said servo aggregate to the vacuum source and the source of atmospheric pressure.

* * * * *

UNITED STATES PATENT AND TRADEMARK OFFICE
CERTIFICATE OF CORRECTION

PATENT NO. : 5,215,358
DATED : June 1, 1993
INVENTOR(S) : Hans-Juergen Beilfuss, Michael Vogt It is certified that error appears in the above—identified patent and that said Letters Patent is hereby corrected as shown below:

On title page, item [54] and col. 1, lines 1-2, should be changed from:

"REAR WHEEL VALVE SWITCHOVER TIRE DELAY FOR ABS"

to:

--REAR WHEEL VALVE SWITCHOVER TIME DELAY FOR ABS--

Signed and Sealed this

Twelfth Day of April, 1994

*Attest:*

BRUCE LEHMAN

*Attesting Officer*  *Commissioner of Patents and Trademarks*